(12) United States Patent
Zhang et al.

(10) Patent No.: US 11,128,479 B2
(45) Date of Patent: Sep. 21, 2021

(54) METHOD AND APPARATUS FOR VERIFICATION OF SOCIAL MEDIA INFORMATION

(71) Applicant: AZ Board of Regents on Behalf of AZ State Univ, Scottsdale, AZ (US)

(72) Inventors: Yanchao Zhang, Phoenix, AZ (US); Xin Yao, Changsha (CN)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 405 days.

(21) Appl. No.: 16/396,550

(22) Filed: Apr. 26, 2019

(65) Prior Publication Data

US 2019/0342103 A1  Nov. 7, 2019

Related U.S. Application Data

(60) Provisional application No. 62/666,049, filed on May 2, 2018.

(51) Int. Cl.
| | |
|---|---|
| H04L 29/06 | (2006.01) |
| H04L 9/32 | (2006.01) |
| G06F 16/9536 | (2019.01) |
| G06F 16/901 | (2019.01) |
| G06F 21/60 | (2013.01) |

(52) U.S. Cl.
CPC ........ H04L 9/3271 (2013.01); G06F 16/9024 (2019.01); G06F 16/9536 (2019.01); G06F 21/602 (2013.01); H04L 2209/38 (2013.01)

(58) Field of Classification Search
CPC ............... H04L 9/3271; H04L 2209/38; G06F 16/9536; G06F 16/9024; G06F 21/602
See application file for complete search history.

(56) References Cited

U.S. PATENT DOCUMENTS

| | | |
|---|---|---|
| 62,664,844 | 4/2018 | Chen |
| 62,675,100 | 5/2018 | Zhang |
| 62,702,837 | 7/2018 | Zhang |
| 16,521,321 | 7/2019 | Zhang |
| 2019/0003327 A1 | 4/2019 | Chen |
| 2019/0003620 A1 | 5/2019 | Zhang |

OTHER PUBLICATIONS

Bloom, B.H., "Space/Time Trade-offs in Hash Coding with Allowable Errors," Communications of the ACM, vol. 13, No. 7, (Jul. 1970), pp. 422-426.
Bowden, "The Impact of Social Media Marketing Trends on Digital Marketing," 2014.

(Continued)

*Primary Examiner* — Shin-Hon (Eric) Chen
(74) *Attorney, Agent, or Firm* — Elliott, Ostrander & Preston, P.C.

(57) ABSTRACT

A system for a social media data provider to provide verification of a social media data query-result. The system receives a social media dataset from a social media network operator, receives a query about the social media dataset from a social media data consumer, queries the social media dataset based on the query and generate the query-result based thereon, generates verification information by which the social media data consumer is to verify a trustworthiness of the query-result, and provides the query-result and the verification information to the social media data consumer.

15 Claims, 13 Drawing Sheets

(56) References Cited

OTHER PUBLICATIONS

Broder, A., et al., "Network Applications of Bloom Filters: A Survey," Internet Mathematics, vol. 1, No. 4, (2002), pp. 485-509.
Chang, A., "Tempers flare at Yelp's town hall for small business owners in L.A.," Los Angeles Times, https://www.latimes.com/business/la-xpm-2013-aug-21-la-fi-tn-yelp-town-hall-reviews-20130820-story.html, (Aug. 21, 2013).
Chen, F., et al., "SafeQ: Secure and Efficient Query Processing in Sensor Networks," IEEE Infocom'10, (Mar. 2010), 9 pages.
Devanbu, P., et al., "Authentic Data Publication over the Internet," Journal of Computer Security, vol. 11, No. 3, (Jan. 2003), pp. 291-314.
Fan, Z., et al., "Towards Efficient Authenticated Subgraph Query Service in Outsourced Graph Databases," IEEE Transactions on Services Computing, vol. 7, No. 4, (Oct. 2014), pp. 696-713.
Goodrich, M.T., et al., "Authenticated Data Structures for Graph and Geometric Searching," CT-RSA'03, (Apr. 2003), 16 pages.
Hacigumus, H., et al., "Providing Database as a Service," Proceedings of the 18th International Conference on Data Engineering, (Feb.-Mar. 2002), 10 pages.
Hu, L., et al., "Spatial Query Integrity with Voronoi Neighbors," IEEE Transactions on Knowledge and Data Engineering, vol. 25, No. 4, (Apr. 2013), pp. 863-876.
Jason, B., "The Im[act of Social Media Marketing Trends on Digital Marketing," Social Media Today, https://www.socialmediatoday.com/content/impact-social-media-marketing-trends-digital-marketing , (Mar. 17, 2014).
Ku, W.-S., et al., "Query Integrity Assurance of Location-based Services Accessing Outsourced Spatial Databases," SSTD '09, (Jul. 2009), 18 pages.
Li, X., et al., "Truth Finding on the Deep Web: Is the Problem Solved?," Proceedings of the VLDB Endowment, vol. 6, No. 2, (Aug. 2013), 12 pages.
Liu, Y., et al., "Authenticating Primary Users' Signals in Cognitive Radio Networks via Integrated Cryptographic and Wireless Link Signatures," 2010 IEEE Symposium on Security and Privacy, (May 2010), 16 pages.
Mamoulis, et al., Advances in Spatial and Temporal Databases, 30 pages (2009).
Merkle, R.C., "A Certified Digital Signature," CRYPTO '89, LNCS 435, (Aug. 1989), pp. 218-238.
Morstatter, F., et al., "Can One Tamper with the Sample API?: Toward Neutralizing Bias from Spam and Bot Content," WWW'16 Companion, (Apr. 11-15, 2016), pp. 81-82.
Morstatter, F., et al., "Is the Sample Good Enough? Comparing Data from Twitter's Streaming API with Twitter's Firehose," Proceedings of the Seventh International AAAI Conference on Weblogs and Social Media, ICWSM'13, (Jul. 2013), pp. 400-408.
Narasimha, M., et al., "Authentication of Outsourced Databases Using Signature Aggregation and Chaining," International Conference on Database Systems for Advanced Applications, Database Systems for Advanced Applications, (Apr. 2006), pp. 420-436.
Pang, H.H., et al., "Scalable Verification for Outsourced Dynamic Databases," Proceedings of the VLDB Endowment, vol. 2, No. 1, (Aug. 2009), pp. 802-813.
Pang, H.H., et al., "Verifying Completeness of Relational Query Answers from Online Servers," ACM Transactions on Information and System Security, vol. 11, No. 2, (May 2008), pp. 5:1-5:50.
Patrick, C., "Yelp's Newest Weapon Against Fake Reviews: Lawsuits," Bloomberg, https://www.bloomberg.com/news/articles/2013-09-09/yelps-newest-weapon-against-fake-reviews-lawsuits, (Sep. 9, 2013).
Sheng, B., et al., "Verifiable Privacy-Preserving Range Query in Two-Tiered Sensor Networks," The 27th Conference on Computer Communications, (Apr. 2008), 10 pages.
Shi, J., et al., "Secure Range Queries in Tiered Sensor Networks," IEEE Infocom'09, (Apr. 2009), 9 pages.
Wu, D., et al., "Authentication of Moving Top-k Spatial Keyword Queries," IEEE Transactions on Knowledge and Data Engineering, vol. 27, No. 4, (May 2015), pp. 922-935.
Yiu, M.L., et al., "Authentication of Moving kNN Queries," ICDE'11, (Apr. 2011), 12 pages.
Yiu, M.L., et al., "Efficient Verification of Shortest Path Search via Authenticated Hints," ICDE'10, (Mar. 2010), 13 pages.
Zhang, J., et al., "Your Actions Tell Where You Are: Uncovering Twitter Users in a Metropolitan Area," 2015 IEEE Conference on Communications and Network Security (CNS), (Sep. 2015), 11 pages.
Zhang, J., et al., "Your Age is No Secret: Inferring Microbloggers' Ages via Content and Interaction Analysis," Proceedings of the Tenth International AAAI Conference onWeb and Social Media, (2016) pp. 476-485.
Zhang, R., et al., "Secure Multidimensional Range Queries in Sensor Networks," MobiHoc'09, (May 2009), 10 pages.
Zhang, R., et al., "Secure Top-k Query Processing via Untrusted Location-based Service Providers," INFOCOM'12, (Mar. 2012), pp. 1170-1178.
Zhao, Y., et al., "B-SUB: A Practical Bloom-Filter-Based-Publish-Subscribe System for Human Networks," 2010 International Conference on Distributed Computing Systems, (Jun. 2010), pp. 634-643.
U.S. Appl. No. 16/782,349.

METHOD AND APPARATUS FOR VERIFICATION OF SOCIAL MEDIA INFORMATION

CROSS-REFERENCE TO RELATED APPLICATIONS

This application claims priority to U.S. provisional patent application No. 62/666,049, filed May 2, 2018, entitled "Method and Apparatus for Verification of Social Media Information", the entire contents of which are incorporated herein by reference.

STATEMENT REGARDING FEDERALLY SPONSORED RESEARCH

This invention was made with government support under contract number W911NF-15-1-0328 awarded by the Army Research Office. The government has certain rights in the invention.

TECHNICAL FIELD

Embodiments of the invention relate to social media data verification, and in particular to a system and method for verifying social media data that has been transferred from an online social media network operator to an untrusted third party social media data provider.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Online social networks (OSNs) are pervasive. As three exemplary popular OSNs, Twitter, Facebook, and Sina Weibo have 310 million, 1.65 billion, and 261 million monthly active users as of the first quarter of 2016, respectively. OSN users produce information at an unprecedented rate and scale. For example, there are about 3 million posts per minute on Facebook and 500 million tweets on Twitter per day. Besides facilitating social interactions, OSNs are increasingly used in massive information campaigns, public relations, political campaigns, pandemic and crisis situations, marketing, and many other public/private contexts. For instance, over 76% of businesses used social media to achieve their marketing objectives in 2014; business retailers have seen 133% increases in their revenues from social media marketing; about 71% of the consumers respond to the feedbacks and recommendations of social users regarding a particular product, according to one study.

The traditional way to access social data is via the public Application Programmatic Interfaces (APIs) provided by each OSN itself, but the data obtained in this way are often incomplete, biased, and even incorrect. For example, Twitter provides the Filter API and Sample API to access real-time tweets as well as the Search API to retrieve historical tweets. These public APIs, however, often have very limited functionalities. For example, the Filter API and Sample API both return at most 1% random samples of all the data satisfying the query condition, according to one study; the data returned by the Filter API have been found strongly biased, according to the same study; and the crawling process of the Sample API can be easily manipulated by attackers wishing to promote their social content, according to a different study. In addition, the Search API searches against a sampling of recent tweets published in the past 7 days. There are also rate limits imposed on these public APIs. For instance, no more than 180 calls per user and 450 calls per application for the Search API can be made every 15 minutes. While the Twitter Firehose API yields 100% of all public tweets, it incurs a prohibitive monetary cost and very high server requirements to host and process the real-time tweets. The public APIs of other OSNs such as Facebook have similar constraints as well.

Social data outsourcing is an emerging paradigm for effective and efficient access to social data. A system built on this paradigm consists of a third-party Social Data Provider (SDP), many OSN operators, and numerous data consumers. The SDP purchases the complete, or at least some portion of the complete, social media data from one or more OSN operators and offers data services, sometimes paid for, sometimes for free, to data consumers who can be any individuals or entities desiring at least some portion of the purchased social media data satisfying some criteria. Some popular SDPs include DataSift, Gnip, NTT Data, Brandwatch, Twazzup, CrowdEye, etc. For example, DataSift has a significant number of data sources, including, for example, Facebook, YouTube, and Tumblr.

One question is how much trust should a data consumer place in the data offered by these SDPs. There have been many stories revealing the dark side of the web industry. For instance, one SDP has "always had a complicated relationship with small businesses" according to a BusinessWeek article, and there have been wide allegations that the SDP has manipulated online reviews based on participation in its advertising programs. As another famous example, the "death of Wei Zexi" has resulted in the official investigation of one of the biggest search engines in China that allegedly has been providing highly skewed search results. In this context, a dishonest SDP can return wrong query results to data consumers by adding fake data and/or deleting/modifying true data in favor of the businesses who pay for the data. An honest SDP may also be hacked to return wrong query results.

SUMMARY

A system for a social media data provider to provide verification of a social media data query-result. The system receives a social media dataset from a social media network operator, receives a query about the social media dataset from a social media data consumer, queries the social media dataset based on the query and generate the query-result based thereon, and generates verification information by which the social media data consumer is to verify a trustworthiness of the query-result. Both the query-result and the verification information is provided to the social media data consumer, which uses the verification information to verity the correctness and/or completeness of the query-result.

DETAILED DESCRIPTION

I. Introduction

Figure 1A:
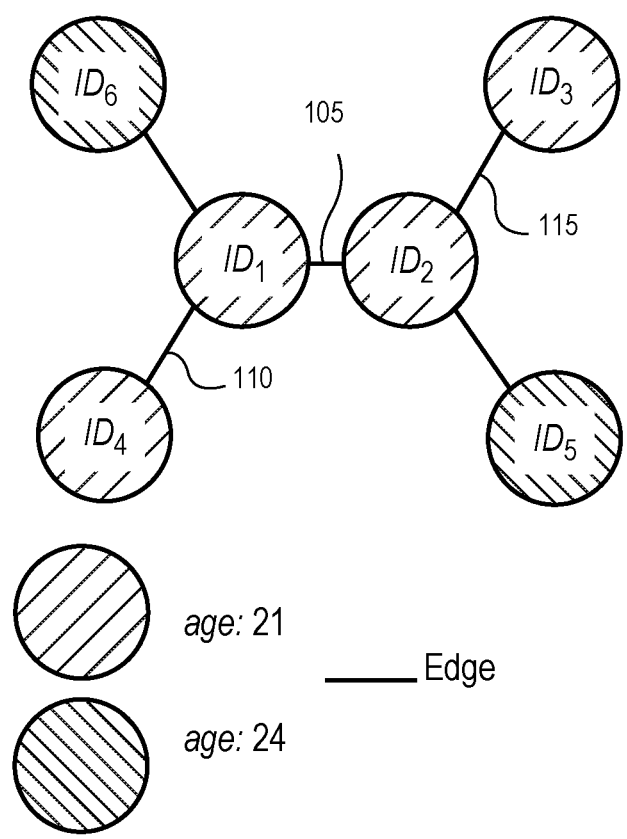
FIG. 1A illustrates an embodiment of the invention.

Social media data, or simply, social data, includes information that OSN users, or social media users publicly share, such as text, pictures, videos, etc., and also includes metadata such as the user's location, language spoken, biographical data and/or shared links. Social data outsourcing is an emerging paradigm for effective and efficient access to the social data. In such a system, a third-party Social Media Data Provider, or simply, a Social Data Provider (SDP) purchases complete social datasets from an Online Social Media Network operators, or simply, Online Social Network (OSN) operators and then resells the datasets to data consumers who can be any individuals or entities desiring the complete social data satisfying some criteria. The SDP cannot be fully trusted and may return wrong query results to data consumers by adding fake data and deleting/modifying true data in favor of the businesses willing to pay. Embodiments of the invention provide verifiable social data outsourcing whereby a data consumer can verify the trustworthiness of the social data returned by the SDP in response to the data consumer's query. Three embodiments are described herein for verifiable queries of outsourced social data. The three embodiments all involve the OSN provider generating cryptographic auxiliary information, based on which the SDP can provide verification information or an indication of verification, for example, construct a verification object, for the data consumer to use to verify the query-result trustworthiness. The cryptographic auxiliary information may also be referred to herein below as simply cryptographic information, or auxiliary information. The embodiments differ in how the auxiliary information is generated and how the verification is provided from the SDP to the consumer, for example, how a verification object is constructed and verified. Extensive experiments based on a real Twitter dataset confirm the high efficacy and efficiency of the embodiments.

One embodiment, considered a basic embodiment or solution, involves each OSN provider generating cryptographic auxiliary information for its dataset, based on which the SDP can construct a verification object that can be used by the data consumer to verify the query-result trustworthiness. A second embodiment, considered an enhanced embodiment or solution compared to the first embodiment, significantly reduces the computation, storage, and communication overhead of the first embodiment by generating the auxiliary information for grouped nodes with identical attribute values. A third embodiment, considered an advanced embodiment or solution, explores a memory-efficient Bloom filter to further reduce the computation, storage, and communication overhead.

The three embodiments were thoroughly evaluated using a real Twitter dataset with 1.5 million nodes and 50 million edges. Experiments show that the basic, enhanced, and advanced embodiments can generate the cryptographic auxiliary information with a data size that is 38.85%, 3.23%, and 0.14%, respectively, of the original social network data in 2973.96 s, 204.33 s, and 211.7 s, respectively. In addition, a data consumer can verify a query result returned by the SDP in 631.8 ms, 25.3 ms, and 29.4 ms, respectively, with the basic, enhanced, and advanced embodiments, respectively. These experimental results confirm the efficacy and efficiency of the three embodiments.

According to one embodiment, the data the SPD provides to the data consumer are trustworthy if and only if two conditions are met. First, the data are correct in the sense that they satisfy the query criteria and were indeed generated by the purported OSN users. Second, the data are complete in the sense that all the data satisfying the query criteria have been returned.

Embodiments of the invention address the following specific problem. The embodiments view the social media dataset for any specific OSN as an undirected social media data graph, or simply, social graph, in which each node corresponds to a unique OSN user and has a set of searchable attributes (e.g., location, age, gender, and education level). An edge exists between two nodes if two users are mutual social media friends; e.g., they follow each other on Twitter. One embodiment focuses on single-attribute queries on any node attribute, each of which can be an equality query (e.g., age="30"), a range query (e.g., age="[20, 30]"), or a subset query (e.g., age="20, 25, 30"). The query result corresponds to a subgraph of the original social graph. It is complete if it contains all the nodes satisfying the query and the associated edges among them, and it is correct if no nodes and edges therein fail to satisfy the query or were illegally or improperly added by the SDP.

II. Problem Formulation

A system for social data outsourcing comprises a SDP, many OSN operators, and numerous data consumers. The SDP acquires the complete, or at least some portion of the complete, social data from one or more OSN operators and profits or provides a benefit by answering data queries from data consumers against the one or more acquired social data sets. For convenience only, subsequent discussions focus on a single OSN operator, but similar operations could be independently performed on the social data of each OSN operator.

Embodiments represent the social data of the OSN operator as an undirected graph $\mathcal{G}$ with n nodes denoted by $V=\{1, \ldots, n\}$, where each node corresponds to a unique OSN user. The terms "nodes" and "users" are used interchangeably hereafter. An undirected edge $e_{i,j}$ (or equivalently $e_{j,i}$) exists between nodes i and j if and only if the two nodes (users) are mutual social media friends. Such mutual friendships are common in OSNs such as Facebook where a friend request needs to be approved. In microblogging systems such as Twitter, anyone can follow arbitrary users (e.g., a pop star), and two users are mutual friends if they follow each other. For the latter case, embodiments of the invention do not consider unidirectional followings which are too arbitrary/random and less meaningful than mutual followings.

A profile of an OSN user includes one or more attributes selected from w universal attributes specific to an OSN operator. Each node representing an OSN user has a profile corresponding tow universal attributes specific to each OSN operator, such as location, age, education level, and hobbies of the user. The profile of node i is denoted by (bi,1, bi,2, . . . , bi,w), where bi,j denote the j-th attribute value for any j ∈[1, w]. An attribute value can be specified by the user him/herself and can also be inferred by the OSN operator based on the user's posts and online interactions. Some attributes such as age have a numeric value by nature, while others such as location and hobbies may have non-numeric values. For the latter case, it is assumed that the OSN operator has rules for converting non-numeric attribute values into numeric ones. For example, a location can be converted into a unique sequence of digits like longitude/latitude, or a telephone number, where those in the same metropolitan area have the same prefix. Such conversions are done by the OSN operator in the background and totally hidden from the user. For simplicity, it is assumed that each attribute value bi,j in the social dataset represents a unique numeric value (possibly after conversion) in the range of the particular attribute. Each node is also affiliated with the data content that the corresponding user has ever generated (e.g., original posts, replies, and comments).

As mentioned above, embodiments contemplate single-attribute queries on any node attribute, each of which can be an equality query (e.g., age="30"), a range query (e.g., age="[20, 30]"), or a subset query (e.g., age="20, 25, 30"). If the queried attribute (e.g., location) has a non-numeric value, the same rules used by the OSN operator are applied to generate the corresponding numeric value. The data consumer submits a query to the SDP, which specifies the query condition and the interested OSN as well. An appropriate payment may also be submitted simultaneously or later.

The SDP processes the query on the specified OSN dataset. The query result includes a subgraph $\mathcal{G}'$ of $\mathcal{G}$, consisting of all the nodes whose attribute values satisfy the query and also the edges among the nodes in $\mathcal{G}'$. In one embodiment, the posts or affiliated data content for each node in $\mathcal{G}'$ are returned as well.

The following trust and adversary models are adopted, according to embodiments. The OSN operator is fully trusted and outsources, that is, transfers or otherwise provides secure access to, the authentic social dataset to the SDP. In contrast, the SDP is untrusted given its ability to modify a data consumer query result by adding, deleting, or modifying data for various, perhaps malicious, motives, e.g., in favor of the businesses/data consumers who are willing to pay for their services. It is also assumed that the communications between the OSN operator and SDP and those between the SDP and the data consumer are secured using traditional mechanisms such as TLS (Transport Layer Security). Therefore, a wrong query result can only be attributed to the actions, e.g., misbehavior, of the SDP, and not some Man-In-the-Middle or co-located attack. Also note that the OSN operator is highly motivated to help identify malicious or negligent SDPs, as data consumers who make critical decisions based on manipulated query results may blame the OSN operator. Under the above trust and adversary models, a query result is said to be trustworthy if the following requirements are met.

Social-graph correctness: All the nodes in the subgraph $\mathcal{G}'$ are indeed in undirected graph $\mathcal{G}$ and satisfy the query. In addition, all the edges in $\mathcal{G}'$ belong to $\mathcal{G}$. Finally, all the attributes values of each node in $\mathcal{G}'$ are intact in contrast to $\mathcal{G}$.

Social-graph completeness: $\mathcal{G}'$ contains all the nodes in $\mathcal{G}$ that satisfy the query and also all the edges in $\mathcal{G}$ that connect any two nodes in $\mathcal{G}'$.

Content authenticity: The data content returned for each node in $\mathcal{G}'$ is the same as that in $\mathcal{G}$.

Content authenticity can be satisfied by letting the query result include the OSN operator's digital signature for each node's data content, which can then be verified by the data consumer. So the embodiments subsequently focus on achieving social-graph correctness and completeness.

III. Embodiments of the Invention

The following description illustrates how to achieve verifiable social data outsourcing by enabling social-graph correctness and completeness verifications. A naïve solution is for the OSN operator to digitally sign the entire dataset, in which case the SDP has to return the entire dataset and the OSN operator's digital signature to each data consumer to verify. This is impractical because most data consumers are only interested in a tiny fraction of what may be a huge dataset. The embodiments disclosed herein enable efficient query processing and also the efficient verifiability of the query result. The three embodiments described below all involve the OSN operator/provider generating cryptographic auxiliary information, based on which the SDP can construct a verification object for the data consumer to verify the query-result trustworthiness. The embodiments differ in how the auxiliary information is generated and how the verification object is constructed and verified.

A. The Basic Embodiment

Recall that each node in the undirected graph $\mathcal{G}$ has a profile of w attributes, each having a numeric value after possible conversion. This embodiment uses cryptographic methods to chain all the nodes in $\mathcal{G}$ and also tie each node with its neighbors (friends) in an ascending order of the attribute values. As long as cryptographic primitives are non-breakable, any manipulated query result can definitely be detected by the data consumer.

1) Generating Cryptographic Auxiliary Information

Before outsourcing the dataset to the SDP, the OSN operator generates cryptographic auxiliary information for each attribute and also for each node to enable the trustworthiness verification of query results.

For each attribute k ∈[1, w], the OSN operator creates an array $\Psi_k = \{\psi_{min}, \psi_1, \ldots, \psi_{max}\}$, in which each element in the array consists of a prefix (denoted by .pre) and a suffix (denoted by .suf). Each prefix corresponds to a unique attribute value, while each suffix equals the Boolean exclusive-ORs (XORs) of hashed node IDs with the corresponding attribute value. Specifically, let $ID_i(\forall i \in[1, n])$ denote the ID of node i, which can be either a real identifier or a pseudonym assigned by the OSN operator for privacy concerns. $\Psi_k$ initially contains two elements $\psi_{min}$ and $\psi_{max}$, where $\psi_{min}$.pre and $\psi_{max}$.pre equal the minimum possible attribute value minus one and the maximum possible attribute value plus one, respectively. In contrast, $\psi_{min}$.suf and $\psi_{max}$.suf are both set to zero. Then the OSN operator checks $\Psi_k$ for the attribute value $b_{i,k}$ of each node i $\in$[1, n]. If there is an element, say $\psi_x$ with $\psi_x$.pre=$b_{i,k}$, the OSN operator updates $\psi_x$.suf:=$\psi_x$.suf$\oplus$h(ID$_i$), where h($\bullet$) denotes a cryptographic one-way hash function such as a Secure Hash Algorithm (SHA). If $b_{i,k}$ does not exist in $\Psi_k$, a new element, say $\psi_x$ with $\psi_x$.pre=$b_{i,k}$ and $\psi_x$.suf=h(ID$_i$), is inserted into $\Psi_k$, of which the preceding and subsequent elements have the prefix value smaller and larger than $b_{i,k}$, respectively.

The next step is to build a binary Merkle Hash Tree (MHT) over the elements in $\Psi_k$. The MHT is a commonly used cryptographic data structure that supports very efficient and secure verification of large-scale datasets. The OSN operator first computes each leaf node as the hash of the concatenation of the prefix and the suffix of a unique element in $\Psi_k$, and the order of the leaf nodes corresponds to the element order in $\Psi_k$. Each internal node of the MHT is then derived as the hash of the concatenation of its two children nodes. Note that if the number of leaf nodes is not a power of two, some dummy leaf nodes (e.g., $\psi_{max}$) are introduced for constructing the MHT. Finally, the OSN operator uses its private key to digitally sign the root of the MHT. The auxiliary information for attribute k $\in$[1, w], denoted by $\mathcal{AU}_{\Psi_k}$, consists of all the internal nodes of the MHT and the signature as well. Later it will be seen that $\mathcal{AU}_{\Psi_k}$ enables verifiable social-graph correctness and completeness pertaining to each individual node.

The OSN operator also generates the auxiliary information, denoted by $\mathcal{AU}_i$, for each node i $\in$[1, n] to ensure the correctness and completeness verifications of the edges (i.e., social links) in the query result. $\mathcal{AU}_i$ contains w+1 elements, denoted by $\mathcal{AU}_{i,k}$ for k $\in$[0, w]. The first element $\mathcal{AU}_{i,0}$ is simply the OSN operator's digital signature over h($b_{i,1}\|b_{i,2}\|\|b_{i,w}\|$ID$_i$), i.e., the hash of the concatenation of node i's w attribute values and ID. Each other element $\mathcal{AU}_{i,k}$ ($\forall$k $\in$[1, w]) corresponds to the k-th attribute. The OSN operator derives $\mathcal{AU}_{i,k}$ in the same way as computing $\mathcal{AU}_{\Psi_k}$ with the exception that the operations involve only node i and all its neighbors (friends) in $\mathcal{G}$.

Finally, the OSN operator sends to the SDP its entire social dataset and all the auxiliary information, i.e., $\{\mathcal{AU}_{\Psi_k}|k \in[1, w]\}$ and $\{\mathcal{AU}_{i,k}|i \in[1, n], k \in[0, w]\}$.

2) Query Processing

The SDP processes a data consumer query as follows, according to an embodiment. A subset query can be decomposed into multiple equality queries, each of which can be considered a special range query with just one queried attribute value.

Subsequent discussions thus focus on a range query [$\delta_{min}$, $\delta_{max}$] over an arbitrary attribute k $\in$[1, w], where $\delta_{min}$ and $\delta_{max}$ denote the minimum and maximum attribute values of interest, respectively.

After receiving a data query or request $\langle$k, $\delta_{min}$, $\delta_{max}\rangle$ for a specific OSN dataset, the SDP searches the corresponding social graph $\mathcal{G}$ to locate all the nodes whose k-th attribute value belongs to [$\delta_{min}$, $\delta_{max}$] and then constructs a subgraph $\mathcal{G}$' which consists of all the qualified nodes and the edges among them in $\mathcal{G}$. The query result includes $\mathcal{G}$' as well as a verification object the SDP constructs according to $\{\mathcal{AU}_{\Psi_k}|k \in[1, w]\}$ and $\{\mathcal{AU}_{i,k}|i \in[1, n], k \in[0, w]\}$ as follows.

First, the SDP locates the maximum k-th attribute value just below $\delta_{min}$ (denoted by $\delta_{min}^-$) and also the minimum k-th attribute value just above $\delta_{max}$ (denoted by $\delta_{max}^+$). $\delta_{min}^-$ and $\delta_{max}^+$ are referred to as boundary values. The SDP then determines the unique attribute values falling into [$\delta_{min}$, $\delta_{max}$], as multiple qualified nodes may have the same attribute value.

Second, the SDP checks $\mathcal{AU}_{\Psi_k}$ to obtain the auxiliary authentication information needed to reconstruct the MHT root for the aforementioned array $\Psi_k$={$\psi_{min}$, $\psi_1$, . . . , $\psi_{max}$} (see Section III-A1 above). Specifically, the qualified attribute values and two boundary values each correspond to the prefix of a unique element in $\Psi$k, so each hash value of the concatenation of the prefix and its corresponding suffix is a leaf node of the MHT. The auxiliary authentication information for each such leaf node includes the siblings of itself, its parent, its parent's parent, etc. Since these leaf nodes are adjacent in the MHT, their auxiliary authentication information should be combined to reduce the likely redundancy. The verification object includes all the auxiliary authentication information and related root signature.

Third, the SDP performs similar operations as above for each qualified node i based on $\mathcal{AU}_{i,k}$. These operations involve node i and its neighbors only (see Section III-A1). The verification object additionally contains all the related auxiliary authentication information and signatures as well, which includes $\mathcal{AU}_{i,0}$, i.e., the OSN operator's digital signature over h($b_{i,1}\|b_{i,2}\|\|b_{i,w}\|$ID$_i$) for each qualified node i.

3) Correctness and Completeness Verification

The data consumer verifies the correctness and completeness of the query result through the following operations in sequence.

First, the data consumer verifies that each node i in $\mathcal{G}$' has the k-th attribute value in [$\delta_{min}$, $\delta_{max}$], and the signature $\mathcal{AU}_{i,0}$ is correct. This step ensures that $\mathcal{G}$' only contains qualified nodes whose attribute values are authentic.

Second, the data consumer reconstructs the MHT root of $\Psi$k based on $\mathcal{G}$' and the auxiliary authentication information in the verification object. The reconstructed MHT root should match the signed one in the verification object. This step ensures that $\mathcal{G}$' includes all the qualified nodes.

Finally, the data consumer uses the auxiliary authentication information in the verification object to reconstruct the root of the MHT for each node i and all its neighbors in $\mathcal{G}$'. The reconstructed MHT root should match the signed one in the verification object. This step ensures that $\mathcal{G}$' contains all the edges between each qualified node i and its qualified neighbors in the original graph $\mathcal{G}$ but not any fake edges.

The query result is considered complete and correct if all the verifications above succeed. The security of this basic embodiment relies on the unanimously assumed security of the cryptographic hash function h($\bullet$) and the digital signature scheme. In particular, the SDP cannot fabricate a query result that can lead to valid MHT roots with correct signatures.

4) An Example

To better illustrate the basic embodiment, an example is provided herein below with reference to FIGS. 1A, 1B and 1C in which social graph 100 has n=6 nodes for a single attribute age, and where FIGS. 1B and 1C correspond to the MHT for the entire graph at 120 and for node 1 (ID$_1$) and its neighbors at 125, respectively. Suppose that the data consumer queries the nodes with age 21 and the edges among these nodes. The qualified nodes are {ID$_1$, ID$_2$, ID$_3$, ID$_4$}, and the edges are {$e_{1,2}$, $e_{1,4}$, $e_{2,3}$} at 105, 110 and 115, respectively. Node 1 has two neighbors (nodes 2 and node 4) with age 21, and the boundary values $\beta_{min}$ and $\beta_{max}$ are −1 and 24, respectively. The verification object thus contains the following information for node 1, {−1∥0, 24∥h (ID$_1$)⊕h (ID$_6$), 120∥0, S(root$_1$)}, where S(•) denotes the OSN operator's digital signature operation. Similarly, the verification object contains {−1∥0, 24∥h(ID$_2$)⊕h(ID$_5$), 120∥0, S(root$_2$)}, {−1∥0, 120∥0, S(root$_3$)} and {−1∥0, 120∥0, S(root$_4$)} for nodes 2, 3 and 4, respectively. Besides, the verification object contains {−1∥0, 24∥h(ID$_5$)⊕h(ID$_6$), 120∥0, S(root)} for the array $\Psi_1$ covering all the nodes.

After receiving the query result, the data consumer derives N$_{...1, 21}$ and N$_{24, 120}$ whereby to compute the MHT root 120. If the root hash equals the signed one in the verification object, the query result is determined to contain all the qualified nodes. Similarly, the data consumer derives candidate root$_1$, root$_2$, root$_3$, and root$_4$. If they all match the signed counterpart in the verification object, the query result contains all the qualified edges. If the query result passes all the verifications, the data consumer considers it correct and also complete.

B. The Enhanced Embodiment

The basic embodiment achieves deterministic detection of fake query results at the cost of significant overhead. Consider the generation of the auxiliary information $\{\mathcal{AU}_{i,k}|i \in[1,n], k \in[1,w]\}$ as an example. The basic embodiment involves the OSN operator constructing a distinct MHT per attribute per node, leading to nw MHTs in total. Each MHT involves the OSN operator signing the root. Since n is extremely large in practice, the computational overhead for signature generation can be daunting especially given that the dataset needs to be updated from time to time. Motivated by the observation that many nodes have the same attribute value, this embodiment builds an MHT for each unique attribute value instead of for each unique attribute for each node. The OSN operator performs the following steps in sequence to generate the auxiliary information for its dataset.

First, the OSN operator computes $\mathcal{AU}_{i,0}$ as $h(b_{i,1}\|b_{i,2}\|\ldots\|b_{i,w}\|ID_i)$ for each node $i \in[1,n]$, i.e., the hash of the concatenation of node i's w attribute values and ID. This is the same as in the basic embodiment except without signing.

Second, for each attribute $k \in[1, w]$ the OSN operator creates an array $\Psi'_k=\{\psi'_{min}, \psi'_1, \ldots, \psi'_{max}\}$ in which each element consists of a prefix (denoted by .pre), an infix (denoted by .inf), and a suffix (denoted by .suf). As in the basic embodiment, $\Psi'_k$ initially contains two elements $\psi'_{min}$ and $\psi'_{max}$, where $\psi'_{min}$.pre and $\psi'_{max}$.pre equal the minimum possible attribute value minus one and the maximum possible attribute plus one, respectively. In contrast, $\psi'_{min}$.inf, $\psi'_{min}$.suf, $\psi'_{max}$.inf, and $\psi'_{min}$.suf are all set to zero. Then the OSN checks $\Psi'_k$ for the attribute value $b_{i,k}$ of each node i $\in[1, n]$. If there is an element, say $\psi'_x$ with $\psi'_x$.pre=$b_{i,k}$, the OSN operator updates $\psi'_x$.inf:=$\psi'_x$.inf $\oplus \mathcal{AU}_0$ and $\psi'_x$.suf:= $\psi'$.suf⊕h(ID$_i$). If $b_{i,k}$ does not exist in $\Psi'_k$, a new element, say $\psi'_x$ with $\psi'_x$.pre=$b_{i,k}$,$\psi'_x$.inf=$\mathcal{AU}_0$ and $\psi'_x$.suf=h(ID$_i$), is inserted into $\Psi'_k$, of which the preceding and subsequent elements have the prefix value smaller and larger than $b_{i,k}$ respectively. Subsequently, the OSN operator derives an MHT based on the concatenation of the prefix, the infix, and the suffix of each element in $\Psi'_k$, and it also signs the MHT root.

Third, the OSN operator creates an array $\Psi_{i,k}(\forall k \in[1, w])$ for each node i $\in[1, n]$ and its neighbors in the graph $\mathcal{G}$. Each element in $\Psi_{i,k}$ consists of a prefix equal to a unique value in attribute k and also a suffix equal to the concatenation of the ID hashes of the nodes with the corresponding attribute value. Each $\Psi_{i,k}$ is the same as that in the basic embodiment, where the prefix values are ranked in the ascending order.

Fourth, the OSN operator constructs another array for each unique value in attribute k($\forall k \in[1, w]$), in which each element is composed of a prefix (denoted by .pre) and a suffix (denoted by .suf). Let mk denote the number of unique values in attribute k and $\Phi_{j,k}$ denote the j-th array ($\forall j \in[1, m_k]$). $\Phi_{j,k}$ is also initialized with two dummy elements corresponding to the minimum attribute value minus one and the maximum attribute value plus one, respectively.

Fifth, for each node i $\in[1, n]$, the OSN operator finds the corresponding array corresponding to $b_{i,k}$, say $\Phi_{x,k}$. Each element in the array $\Psi_{i,k}$ is then traversed. If its prefix value can be found in $\Phi_{x,k}$, its suffix is appended to that of the corresponding element in $\Phi_{x,k}$; otherwise, it is inserted into $\Phi_{x,k}$ in the ascending order of the attribute value.

Finally, the OSN operator generates an MHT for each $\Phi_{j,k}$ ($\forall j \in[1, m_k], k \in[1, w]$) based on its concatenation values in the similar way as before, and also signs the root of each MHT tree.

As in the basic embodiment, the auxiliary information includes the internal nodes of all the MHT trees and also all the signatures. It is sent along with the dataset to the SDP. In addition, the enhanced and basic embodiments use almost the same processes to process a query and verity a query result. The only exception is that the verification object should contain the auxiliary authentication information necessary to reconstruct and verify the roots of the MHTs whose corresponding attribute values satisfy the query.

Figure 1B:
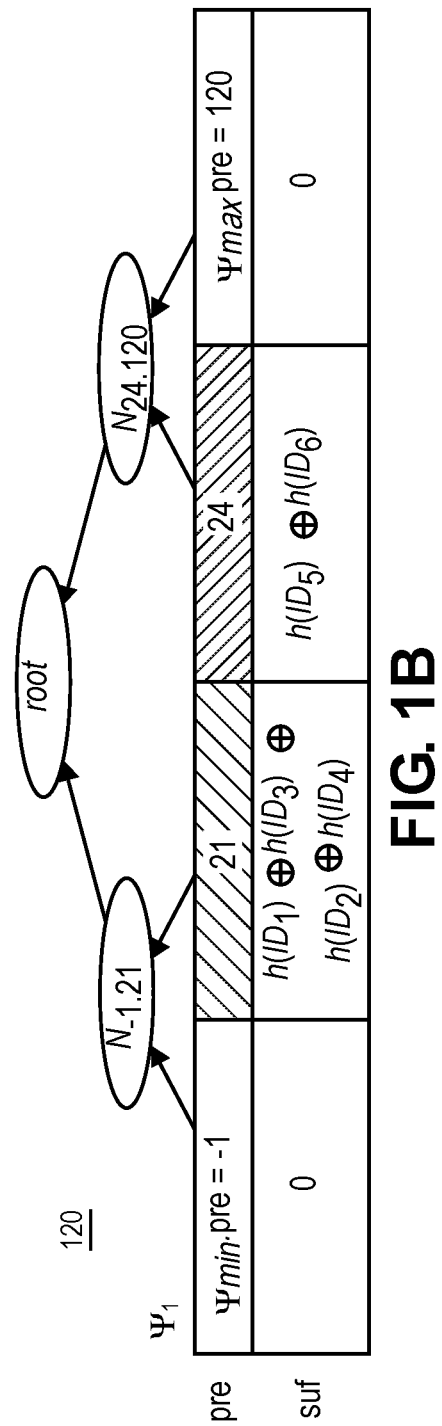
FIG. 1B corresponds to the MHT for the graph illustrated in FIG. 1A.
Figure 1C:
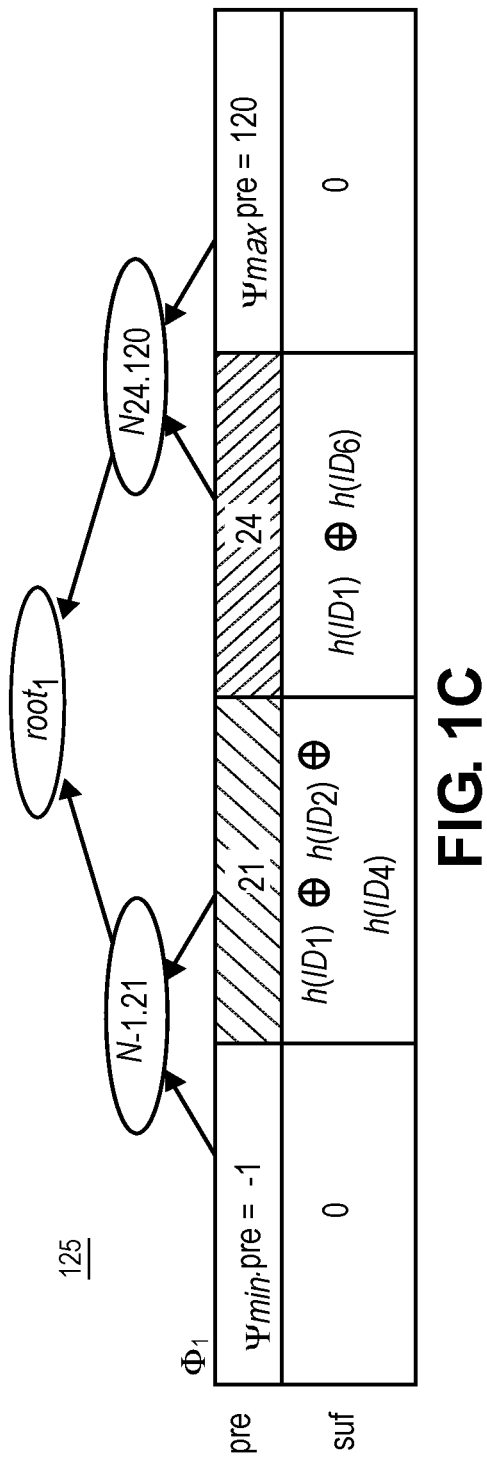
FIG. 1C corresponds to the MHT for the graph illustrated in FIG. 1A.

Continuing with the example in FIGS. 1A, 1B and 1C, the data consumer also queries the nodes age 21 and their edges. The verification information for the attribute value 21 includes {−1∥0, 24∥h(ID$_2$)⊕h(ID$_5$)∥h(ID$_1$)⊕h(ID$_6$), 120∥0, S(root$_{21}$)}. Based on this verification information, the data consumer can guarantee the completeness of attribute values and nodes.

C. The Advanced Embodiment

The advanced embodiment further reduces the signature operations by constructing a Bloom filter instead of an MHT for each $\Phi_{j,k}(\forall j \in[1, m_k], k \in[1, w])$, where $m_k$ again denotes the number of unique values in attribute k.

A Bloom Filter is a space-efficient probabilistic data structure for set-membership testing among many other applications. This embodiment assumes the use of an $\alpha$-bit Bloom filter for a data set $\{d_i\}_i^\beta=1$ which has every bit initialized to bit-0. Let $\{hj( )=_j^\tau=1$ denote $\tau$ different hash functions, each with output in $[1, \alpha]$. Every element $d_i$ is added into the Bloom filter by setting all bits at positions $\{h_j(d_i)\}_j^\tau=1$ to bit-1. To check the membership of an arbitrary element e in the given data set, simply verify whether all the bits at positions $\{h_j(e)\}_j^\tau=1$ have been set. If not, e is certainly not in the data set; otherwise, it is in the data set with some probability jointly determined by $\alpha$, $\beta$, and $\tau$.

In the advanced embodiment, the OSN operator generates $\Phi_{j,k}(\forall j \in[1, m_k], k \in[1, w])$ as in the enhanced embodiment and then initializes the corresponding Bloom filter $\mathcal{BF}_{j,k}$. The prefix and suffix of each element in $\Phi_{j,k}$ (except the dummy elements) are both inserted into $\mathcal{BF}_{j,k}$. Finally, the OSN operator signs $\mathcal{BF}_{j,k}$.

The auxiliary information is now composed of all the internal nodes of the MHT for $\Psi'_k$, the Bloom filters $\{\mathcal{BF}_{j,k}|j \in [1, m_k], k \in [1, w]\}$, and all the related signatures. In addition, the advanced embodiment uses the almost identical processes for query processing and query-result verification to those in the basic and enhanced embodiments. The only exception is that the verification object contains the signed Bloom filters whose corresponding attribute values satisfy the query. Therefore, the data consumer can construct an array like $\Phi_{j,k}$ for each unique attribute value in the query result and check whether all the array elements are in the corresponding signed Bloom filter. If not, the query result is untrustworthy.

Continuing further with the example in FIGS. 1A, 1B and 1C, given the same query for age 21, the verification information from the array $\Psi''_k$ is identical with that in the enhanced embodiment. However, the verification information for the attribute value 21 changes to $\{\mathcal{BF}_{21,1}, S(\mathcal{BF}_{21,1})\}$. The data consumer first matches the Bloom filter $\mathcal{BF}_{21,1}$ with the OSN operator's signature $S(\mathcal{BF}_{21,1})$. Subsequently, it verifies whether the two values, h(21) and h(h(ID$_1$)⊕h(ID$_2$)⊕h(ID$_4$)||h(ID$_2$)⊕h(ID$_1$)⊕h(ID$_3$)||h(ID$_3$) ⊕h(ID$_2$)||h(ID$_4$)⊕h(ID$_1$)), are both in the Bloom filter $\mathcal{BF}_{21,1}$. If the query result passes these verification, the data consumer considers it correct and complete.

Figure 6:
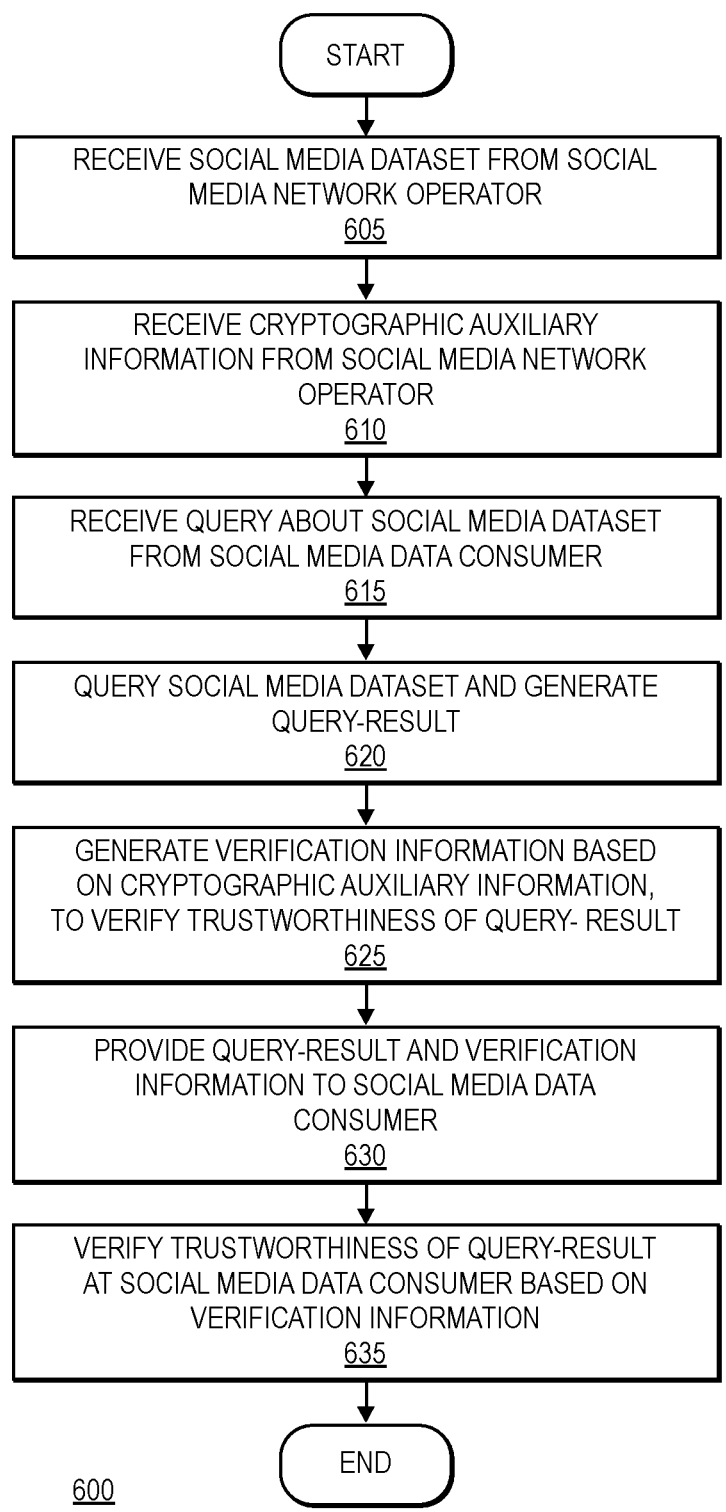
FIG. 6 is a flow diagram of embodiments of the invention relating to a system for a social media data provider to provide verification of a social media data query-result.

With reference to FIG. 6, embodiments of the invention 600 involve a system for a social media data provider to provide verification of a social media data query-result, comprising logic and computing resources to effectuate such logic to receive at a social media data provider a social media dataset from a social media network operator at 605. The system further includes logic to receive at the social media data provider a query about the social media dataset from a social media data consumer at 615. Logic for the social media data provider then queries the social media dataset based on the query and generate the query-result based thereon at 620. The social media data provider further generates at logic 625 verification information by which the social media data consumer is to verify a trustworthiness of the query-result. The social media data provider logic, at 630, sends the query-result and the verification information to the social media data consumer.

According to an embodiment, the social media network operator generates cryptographic auxiliary information based on the social media data set it sends to the social media data provider. The provider's logic at 610 receives this cryptographic information. The social media data provider generates the verification information at 625 based on this cryptographic auxiliary information.

According to an embodiment, the logic 630 that provides the query-result and the verification information to the social media data consumer comprises logic that provide to the social media data consumer: a subgraph G' of the graph G consisting of all the plurality of n nodes whose attribute values satisfy the query, and the edges among the nodes in G', and data content affiliated with each node in G'.

The social media data consumer includes logic to receive the subgraph G' of the graph G consisting of all the plurality of n nodes whose attribute values satisfy the query, and the edges among the nodes in G', and verify at 635 the trustworthiness of the query-result when all the plurality of n nodes in the subgraph G' are in the graph G and satisfy the query, all the edges among the nodes in G' are in the graph G, and all the attributes values of each node in the subgraph G' are intact with respect to the graph G.

The social media data consumer further includes logic to receive the subgraph G' of the graph G consisting of all the plurality of n nodes whose attribute values satisfy the query, and the edges among the nodes in G', and verify at 635 the subgraph G' contains: all the plurality of n nodes in the graph G that satisfy the query, and all the edges in the graph G that connect any two nodes in the subgraph G'.

Finally, the social media data consumer includes logic to receive the subgraph G' of the graph G consisting of all the plurality of n nodes whose attribute values satisfy the query, and the edges among the nodes in G' and verify the data content affiliated with each node in the subgraph G' is identical to the data content affiliated with the same node in graph G.

IV. Security and Overhead Analysis

The following discussion analyzes the security and overhead of the embodiments.

A. Security Analysis

The basic and enhanced embodiments both enable a data consumer to detect an incorrect and/or incomplete query result in a deterministic fashion. The reason is that the auxiliary information amounts to chaining the authentic nodes, attribute values, and edges with cryptographic methods. As long as the hash function and digital signature scheme used for constructing the MHTs are secure, the SDP cannot modify the authentic query result without failing the signature verification.

In contrast, the advanced embodiment detects an incorrect and/or incomplete query result with overwhelming probability. On the one hand, the signed MHT can effectively prevent the SDP from inserting/deleting nodes or modifying any attribute value in the query result while escaping the detection. On the other hand, the signed Bloom filters may not reveal all the illegitimate edge insertions or deletions by the SDP. In particular, assume that the SDP deletes (or adds) one edge between nodes i and l from the query result for attribute k. In the query-result verification phase, the data consumer derives many array elements and then checks whether each of them is indeed in the corresponding Bloom filter. An edge deletion (or addition) results in two new array elements related to nodes i and l, respectively. If both of them are found in the corresponding Bloom filter (i.e., two false positives), the SDP escapes the detection. The false-positive probability of a Bloom filter with parameters $\langle \alpha, \beta, \tau \rangle$_can be estimated as $0.6185^{\alpha/\beta}$, for which $\tau$ is set as $$\frac{\alpha}{\beta} \times \ln 2$$

to minimize the false-positive rate. So the SDP can escape the detection with probability $(0.61854\alpha/\beta)2\chi$ for adding (or deleting)$\chi \geq 1$ edges from the query result.

B. Overhead Analysis

Computation, communication, and storage overhead that the embodiments incur are analyzed to enable the correctness and completeness verifications of the query results. The overhead that exists with or without the embodiments is ignored in the following analysis (e.g., the time to search for qualified nodes).

1) Computation Overhead

All embodiments involve digital signature generations, verifications, and hash operations. The computation overhead is dominated by signature generations and verifications (especially, the former), so one can safely ignore the hash operations for simplicity.

First, the computation overhead is estimated at the OSN operator for generating the auxiliary information. The OSN operator needs 2·n+1 signature operations for attribute k in the basic embodiment, thus the complexity of signature operations is O(n). The OSN operator takes $m_k$+1 signature operations for attribute k in the enhanced embodiment. Hence, the complexity of signature operations in the enhanced embodiment is O($m_k$). In the advanced embodiment, the OSN operator also takes $m_k$+1 signature operations, so the complexity is O($m_k$).

Next, the computation overhead at the data consumer for verifying a query result is discussed. Suppose that the number of nodes in the query result is z. In the basic embodiment, the data consumer performs up to 2·z+1 signature verifications, leading to the complexity of O(z). Assume that the number of unique attribute values in the query result is $m'_k$. In the enhanced embodiment, the data consumer performs up to $m'_k$+1 signature verifications, resulting in the complexity of O($m_k$). As well, the advanced embodiment requires the data consumer to verify no more than $m'_k$+1 signatures, meaning the complexity O($m'_k$).

2) Communication and Storage Overhead

First discussed is the communication overhead for transmitting the auxiliary information from the OSN operator to the SDP, which is the same as the storage overhead at the SDP for storing the auxiliary information. For convenience, only a single attribute k is considered, and the overall overhead can simply be scaled by a factor of w for all w attributes. Let $l_{hash}$ and $l_{sig}$ denote the lengths of a hash value and a digital signature, respectively. Assume that node i and its neighbors have $\theta_{i,k}$ unique values for attribute k. In the basic embodiment, the communication overhead includes (2·n+1)·$l_{sig}$ and $$\left(\sum_{i=1}^{n}(2^{log2\lceil\theta_{i,k}\rceil}-2)+2^{log2\lceil m_k\rceil}-2\right)l_{hash}.$$

Since $\theta_{i,k}$ is no more than $m_k$, the communication complexity of the basic embodiment is O(n$2^{log2\lceil m_k\rceil}$) hash values and O(n) signatures. Let $\rho_{j,k}$ denote the number of unique attribute values of neighbors for nodes with each unique value in attribute k. In the enhanced embodiment, the communication overhead consists of ($m_k$+1)·$l_{sig}$ and $$\left(\sum_{i=1}^{m_k}(2^{log2\lceil\rho_{j,k}\rceil}-2)+2^{log2\lceil m_k\rceil}-2\right)l_{hash}.$$

Likewise, the worst case for $\rho_{j,k}$ is also $m_k$, the enhanced embodiment incurs the communication complexity of $$O(m_{k\cdot 2}^{log2m_k})$$

hash values and O($m_k$) signatures. Finally, the communication overhead of the advanced embodiment is composed of ($m_k$+1)·$l_{sig}$, ($m_k$-2)·$l_{hash}$, and $\Sigma_{j=1}^{m_k}|\mathcal{BF}_{j,k}|$, where $|\mathcal{BF}_{j,k}|$ denotes the length of the Bloom filter $\mathcal{BF}_{j,k}$. So the advanced embodiment incurs the communication complexity of O($m_k$) signatures, O($m_k$) hash values, and O($m_k$) Bloom filters.

The three embodiments also incur the communication overhead for transmitting the verification object from the SDP to the data consumer, which depends on the particular query that determines how many nodes and edges are in the query result. Since it is difficult to give a meaningful, generic estimation, this discussion omits it here but it should be noted that the communication overhead for transmitting the verification object from the SDP to the data consumer is considerably smaller than the communication overhead for transmitting the auxiliary information from the OSN operator to the SDP.

V. Experimental Results

The three embodiments were evaluated using experiments with real datasets. All three embodiments used Python 2.7 with a total of 1800+ lines of code. All the experiments were carried out on a commodity PC, with 3.4 GHz Intel-i7 3770 CPU, 16 GB memory, a 7200 RPM hard disk, and Windows 10 OS. The false positive probability of the Bloom filter in the advanced embodiment was set to 0.001 unless mentioned otherwise.

A. Datasets

A real-world Twitter dataset was collected in March 2016. Specifically, 100,000 Twitter users were randomly selected as seeds. Each seed user was crawled for attributes, followers and friends, resulting in nearly 4 M users' attributes and the corresponding social graph. Subsequent experiments focus on location attribute. Location with city-level labels in the form of "city-Name,stateName" or "cityName,stateAbbreviation" was extracted, where all cities in the "List of Valid U.S. cities" were considered. (www.whitehouse.gov/sites/default/files/omb/assets/procurement_fair/usps_city_state_list.xls). Among all the crawled users, 1.6 M users were found with valid location attribute and more than 50 M edges among them.

To evaluate the performance of the embodiments for datasets with different sizes, three groups of users (S-100 K, S-1 M, S-1.5 M) were randomly sampled from the above dataset, i.e., 100 K, 1 M, 1.5 M users and their corresponding social graphs. The sizes of three sampled datasets S-100 K, S-1 M and S-1.5 M are 315.58 MB (10.95 MB users' attribute, 304.63 MB social network), 3.13 GB (109.57 MB users' attribute, 3.02 GB social network), 4.71 GB (164.36 MB users' attribute, 4.54 GB social network), respectively.

B. Generating Auxiliary Information

The computation and storage overhead incurred by generating auxiliary information in the basic, enhanced, and advanced embodiments was also evaluated.

TABLE I

| | Computation overhead | | | | | | | | |
|---|---|---|---|---|---|---|---|---|---|
| | Basic | | | Enhanced | | | Advanced | | |
| | hash | XOR | sign | hash | XOR | sign | hash | XOR | sign |
| S-100K | 4.92M | 3.47M | 192.28K | 3.71M | 3.13M | 1.2K | 3.38M | 3.13M | 1.2K |
| S-1M | 50.5M | 35.5M | 1.98M | 35.9M | 34.2M | 3.49K | 34.5M | 34.2M | 3.49K |
| S-1.5M | 76.0M | 53.5M | 2.98M | 53.74M | 51.87M | 4.07K | 52.06M | 51.87M | 4.07K |

1. Computation Overhead

The three embodiments were compared in terms of the number of hash, XOR, and signature operations, and computation time. Table I lists the numbers of hash, XOR, and sign operations for all three embodiments and all three datasets. As can be seen from Table I (1) the basic embodiment required the highest number of hash operations, followed by the enhanced embodiment and the advanced embodiment; (2) all three embodiments required similar numbers of XOR operations; and (3) the number of signature operations in the advanced embodiment and enhanced embodiments were significantly lower than that of the basic embodiment. For example, the number of signature operations in the advanced and enhanced embodiments were only 0.13% of that in the basic embodiment for S-1.5 M, respectively. This is expected, as the complexity of signature operations in the three embodiments are $O(n)$, $O(m_k)$ and $O(m_k)$, respectively. Finally, Table II shows the total computation time of generating auxiliary information for three datasets. One can see the advanced embodiment and the enhanced embodiment almost take the same time for generating auxiliary information, and shorter time than the basic embodiment. For example, the computation time in the basic embodiment is 14.04× of that in the advanced embodiment for S-1.5 M.

TABLE II

| | Computation time. | | |
|---|---|---|---|
| | Basic | Enhanced | Advanced |
| S-100K | 192.69 s | 16.33 s | 16.88 s |
| S-1M | 2111.46 s | 139.91 s | 143.23 s |
| S-1.5M | 2973.96 s | 204.33 s | 211.7 s |

2. Storage Overhead

Table III shows the storage overhead of auxiliary information, i.e., the total size of signatures, internal nodes of MHTs, and Bloom filters, in the basic, enhanced, and advanced embodiments in bits. Table III illustrates that the basic embodiment incurs the highest storage overhead, followed by the enhanced embodiment and the advanced embodiment. Consider S-1.5 M as an example, the storage overhead of the basic, enhanced or advanced embodiment are 1.83 GB, 155.8 MB or 6.76 MB, respectively. This is of no surprise, as the complexities of storage overhead for signatures and hash values in the basic and enhanced embodiments are $O(n)$, $$O(n \cdot 2^{log2 m_k}) \text{ and } O(m_k), O(m_k \cdot 2^{log2 m_k}),$$

and the advanced embodiment utilizes space-efficient data structure (Bloom filter) to further reduce the storage overhead. Table III also shows the ratio between the size of the auxiliary information and that of original user data. It is clear that the advanced embodiment incurs very small additional storage overhead for auxiliary information.

TABLE III

| | Storage overhead. | | |
|---|---|---|---|
| | Basic | Enhanced | Advanced |
| S-100K | 121.22 MB (38.41%) | 31.16 MB (9.87%) | 1.44 MB (0.45%) |
| S-1M | 1.22 GB (38.98%) | 125.42 MB (3.91%) | 5.49 MB (0.17%) |
| S-1.5M | 1.83 GB (38.85%) | 155.8 MB (3.23%) | 6.76 MB (0.14%) |

C. Query Processing

Figure 2A:
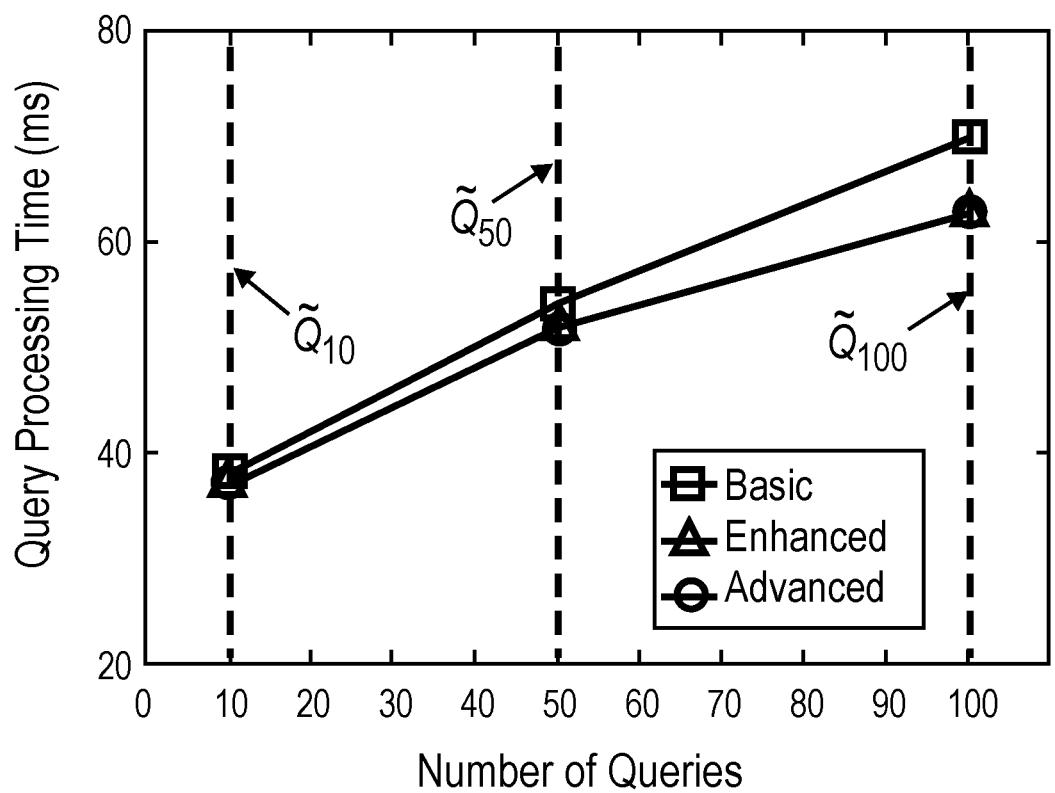
FIG. 2A depicts a comparison of query processing time according to embodiments of the invention.
Figure 2B:
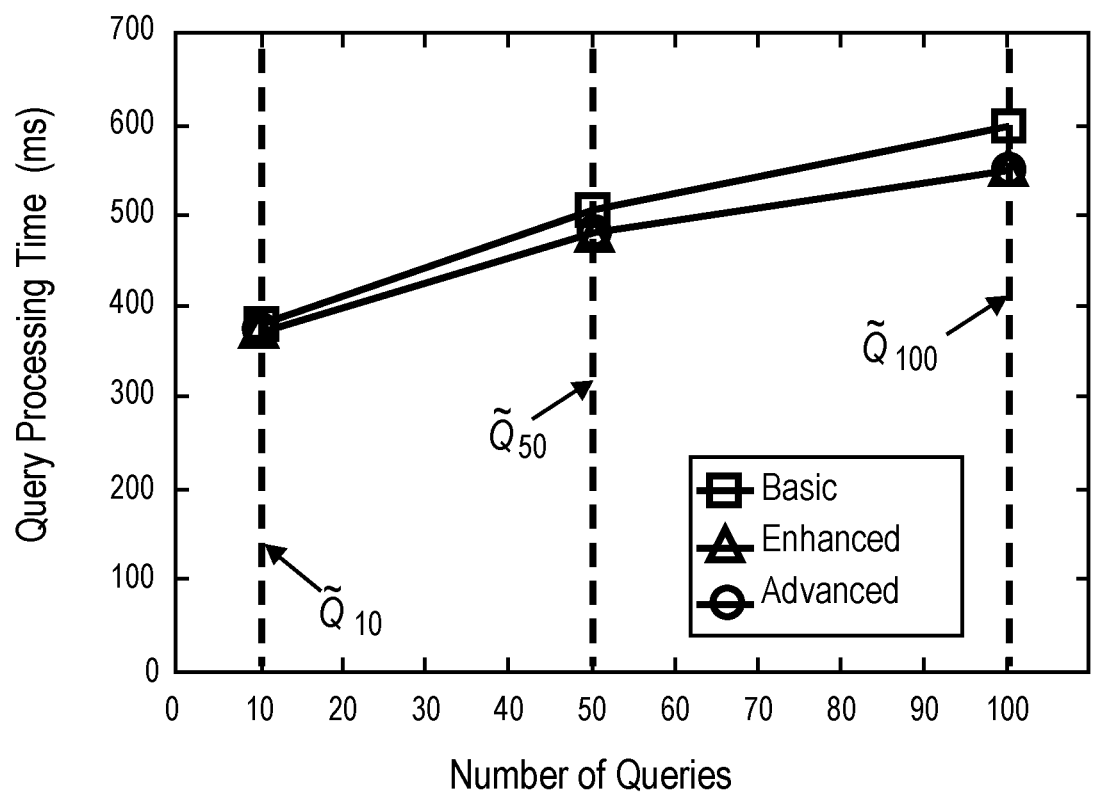
FIG. 2B depicts a comparison of query processing time according to embodiments of the invention.
Figure 2C:
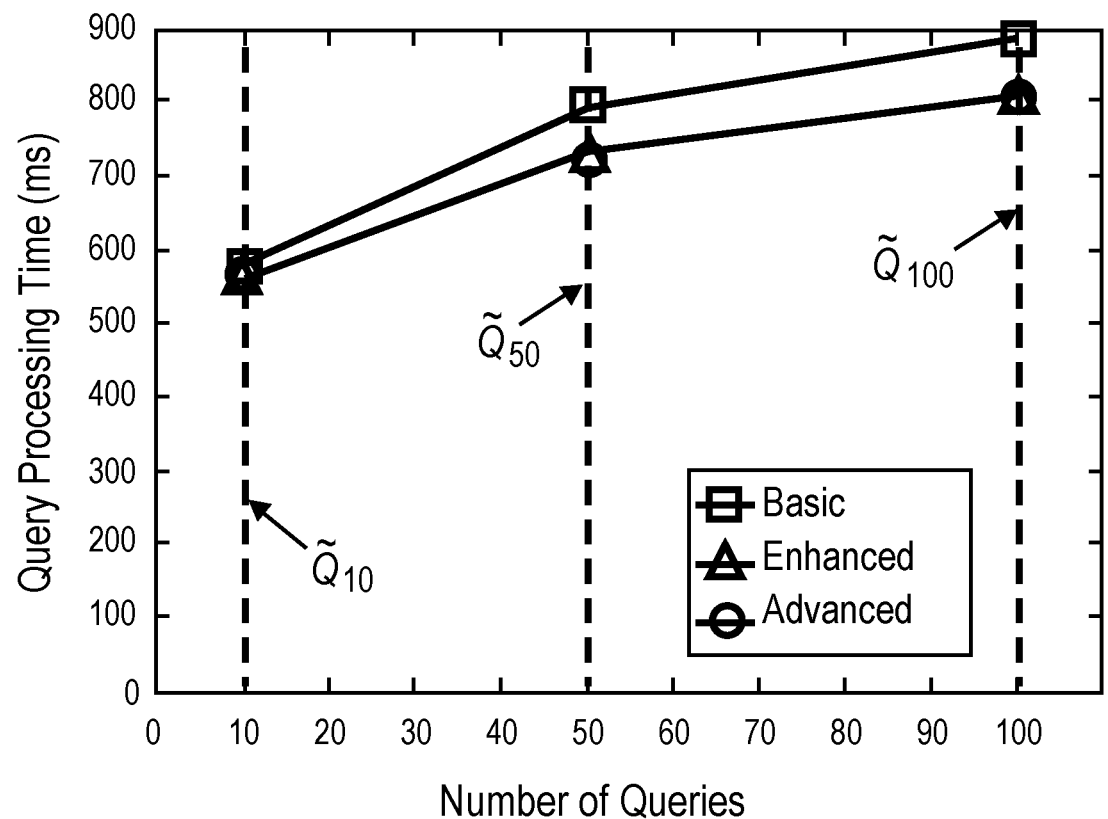
FIG. 2C depicts a comparison of query processing time according to embodiments of the invention.

To evaluate the computation overhead incurred by query processing, three types of queries were generated: $Q_{10}$, $Q_{50}$, and $Q_{100}$, where the query $Q_x$ means randomly choosing x cities as the query condition for x=10, 50 and 100. FIGS. 2A, 2B and 2C show the query processing times of three embodiments for the three types of queries for all three datasets, where each point represents the average of 100 runs, each with a random seed. It can be seen that the query processing time of the basic embodiment is the longest and that of the enhanced and advanced embodiments are similar. For S-1.5 M (FIG. 2C), it takes the SDP only 807 ms to process 100 queries under the advanced embodiment.

D. Query-Result Verification

Figure 3A:
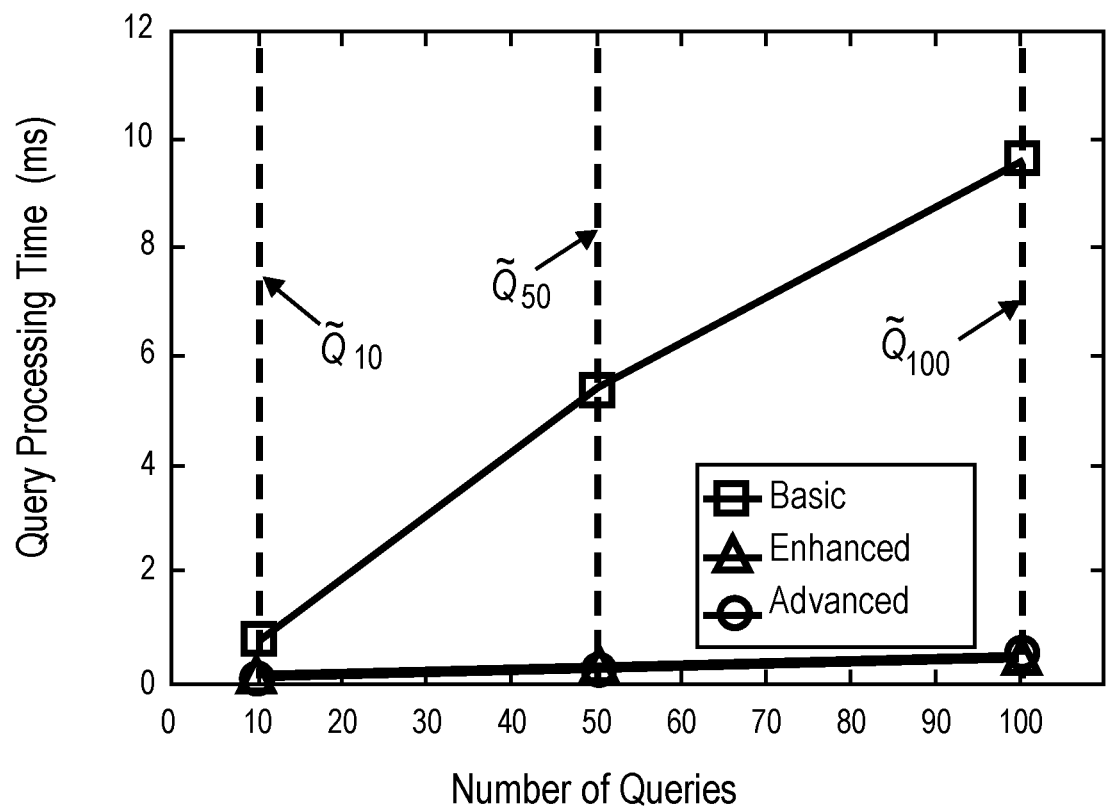
FIG. 3A depicts a comparison of query-result verification time according to embodiments of the invention.
Figure 3B:
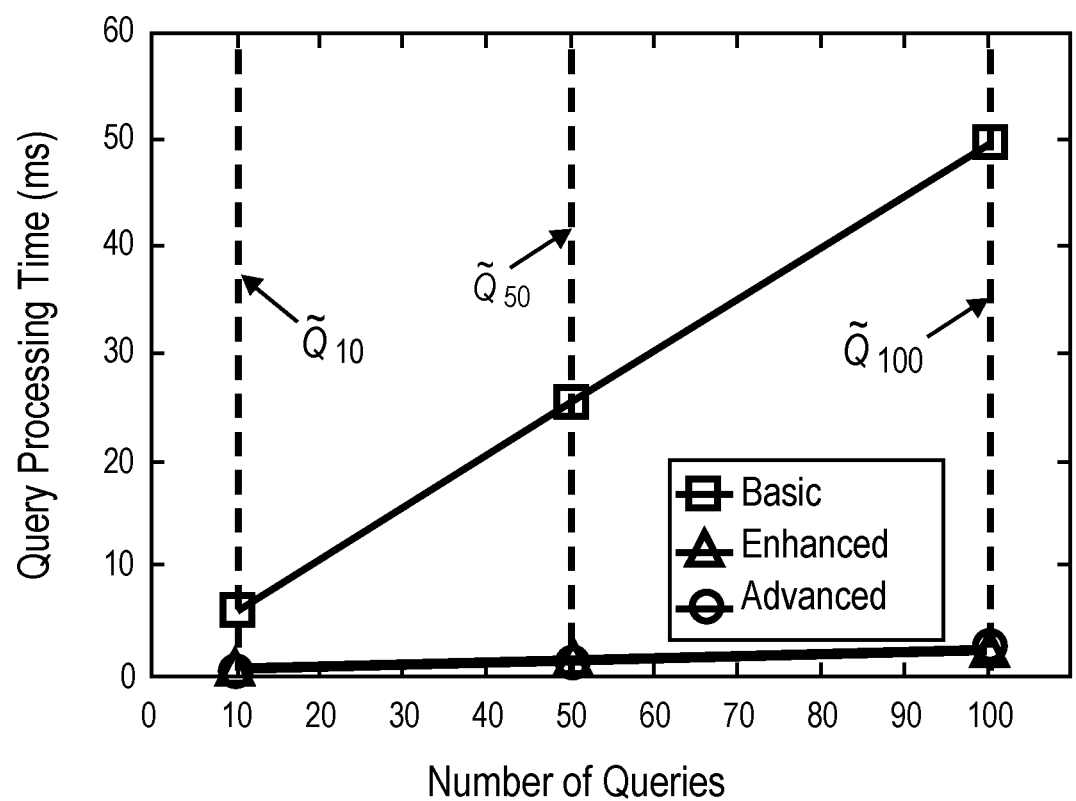
FIG. 3B depicts a comparison of query-result verification time according to embodiments of the invention.
Figure 3C:
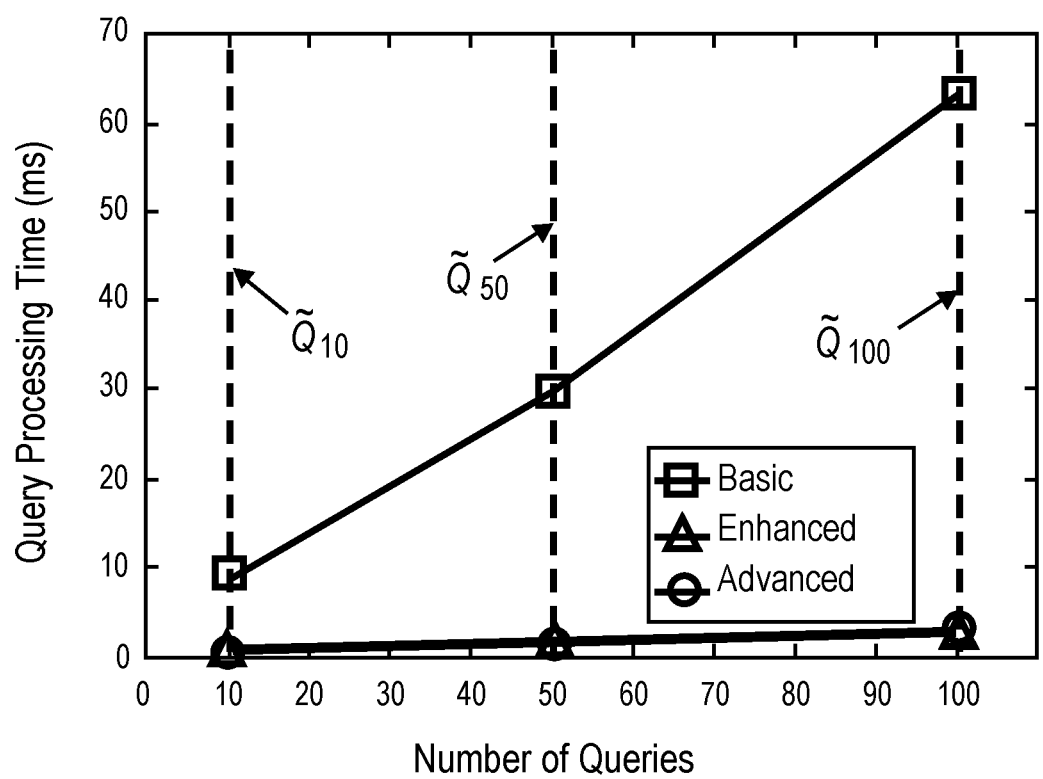
FIG. 3C depicts a comparison of query-result verification time according to embodiments of the invention.

FIGS. 3A, 3B, and 3C compare the time for query-result verification under three proposed embodiments for three datasets. It can be seen that the verification time in the advanced and enhanced embodiments are almost the same, followed by the basic embodiments. This is expected, as the complexities of signature verification in three embodiments are $O(z \cdot m'_k)$, $O(m'_k)$ and $O(m'_k)$, respectively. Moreover, the average verification time in the advanced embodiment is 29.4 ms for the dataset S-1.5 M, which clearly shows its high efficiency for real application.

E. Impact of Bloom Filter on the Advanced Embodiment

Figure 4A:
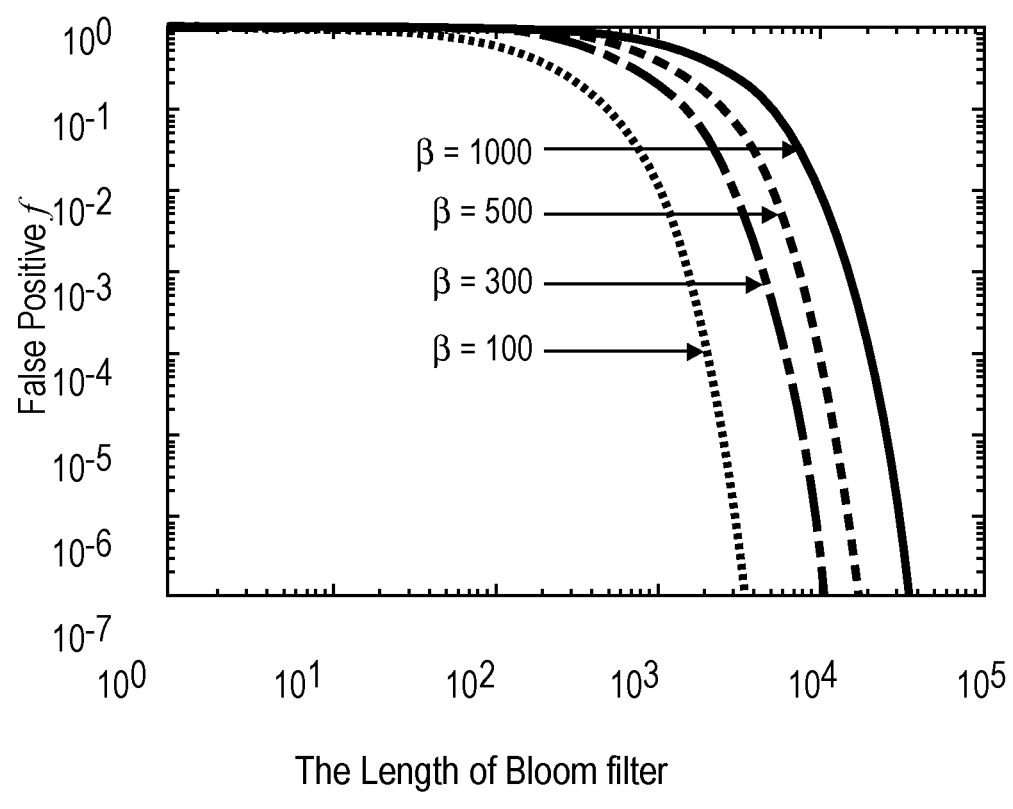
FIG. 4A illustrates the impact of Bloom filter size on false positive probability and storage overhead in accordance with an embodiment of the invention.
Figure 4B:
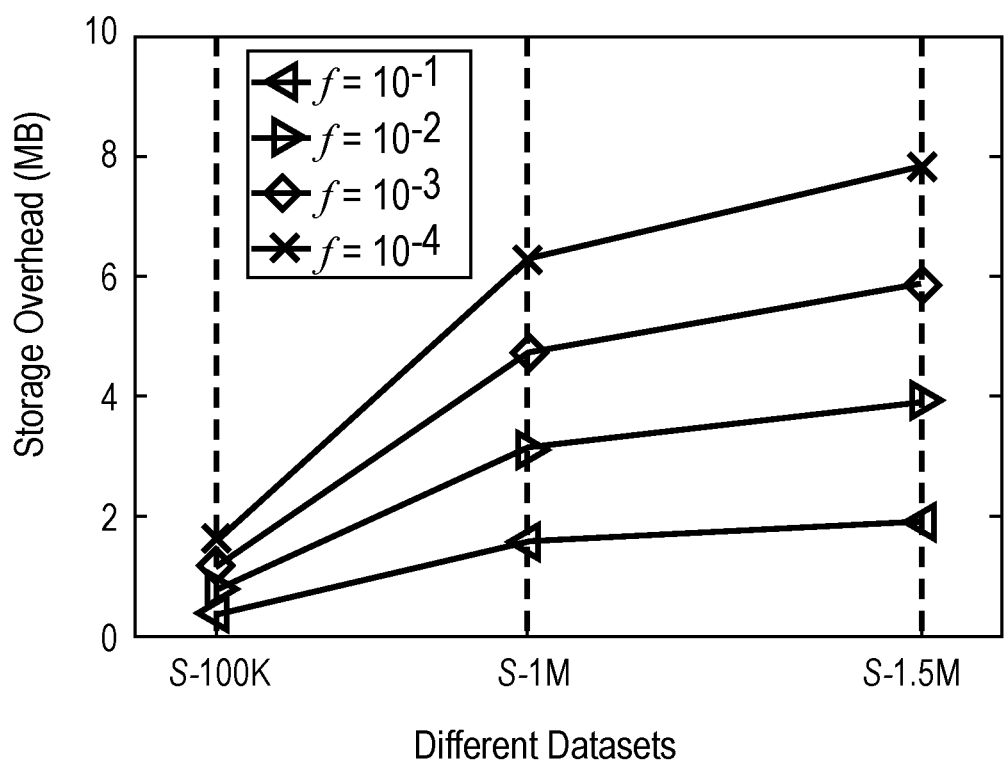
FIG. 4B illustrates the storage overhead incurred by all the Bloom filters according to embodiments of the invention FIG. 5. illustrates a block diagram of a computing environment in and via which an embodiment of the invention may operate.

FIG. 4A shows the false-positive probability of a Bloom filter varying with its length, where the number of elements β=100, 300, 500, and 1,000. One can see that the lower the false positive probability that is desired, the larger the Bloom filter needs to be. In addition, the more elements inserted into the Bloom filter, the higher the false positive probability, and vice versa. These results coincide with the property of Bloom filter. FIG. 4B shows the storage overhead incurred by all the Bloom filters for S-100 K, S-1 M and S-1.5 M with false positive probability varying from $10^{-1}$ to $10^{-4}$. It can be seen that if false positive probability is reduced from $10^{-3}$ to $10^{-4}$, the storage overhead incurred by all the Bloom filters for S-1.5 M increases by only 2 MB. Recall that Table III that the total storage overhead of the advanced embodiment is 6.76 MB for S-1.5 M when $f=10^{-3}$, so the total storage overhead is 8.76 MB for S-1.5 M when $f=10^{-4}$, which is still significant lower than that of the basic and the enhanced embodiments.

VI. Computing Environment

Figure 5:
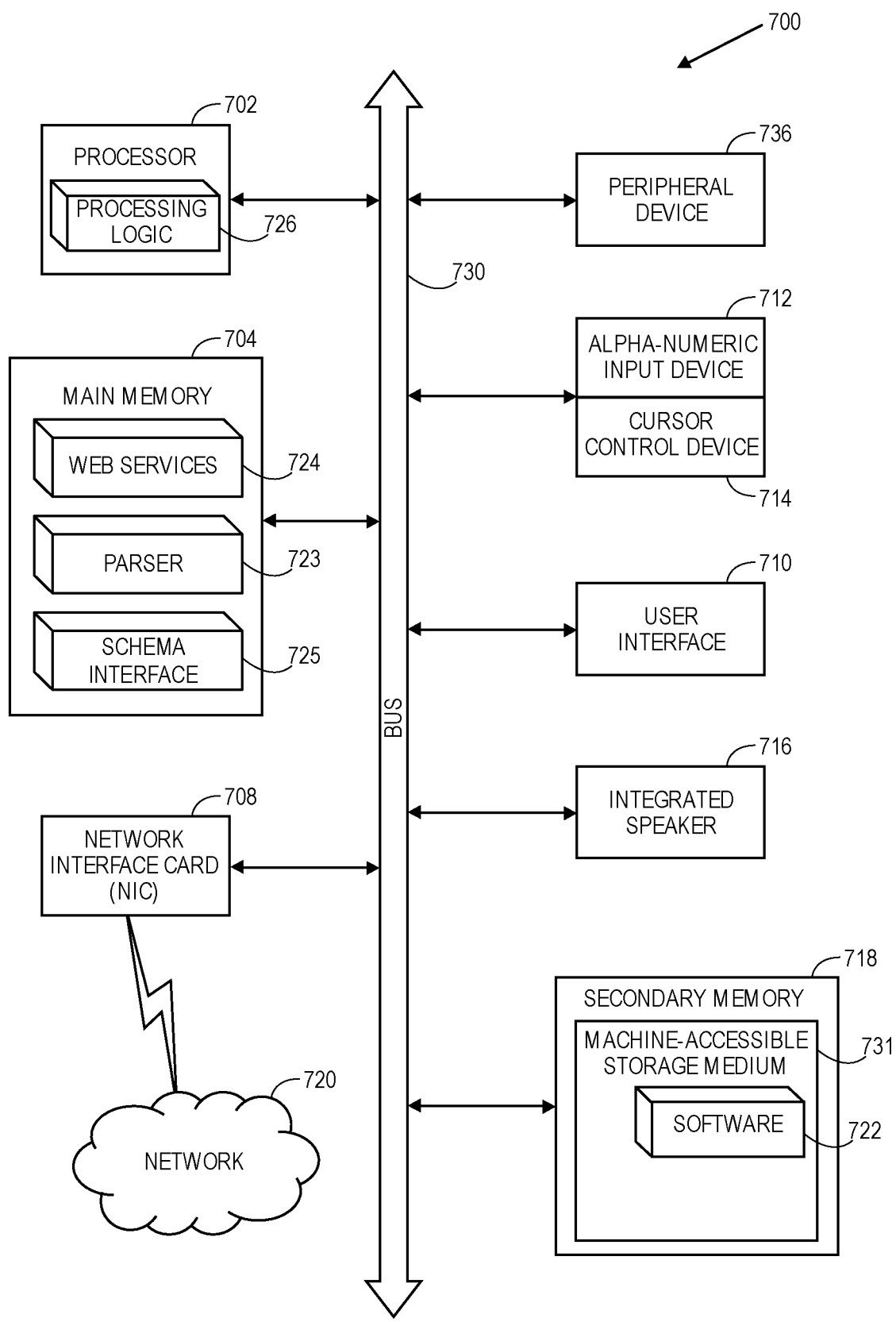

FIG. 5 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 718, which communicate with each other via a bus 730. Main memory 704 includes information and instructions and software program components necessary for performing and executing the functions with respect to the various embodiments of the systems, methods for implementing embodiments of the invention described herein. Instructions 723 may be stored within main memory 704. Main memory 704 and its sub-elements are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which are discussed herein.

The computer system 700 may further include one or more network interface cards 708 to interface with the computer system 700 with one or more networks 720. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

The invention claimed is:

1. A system for a social media data provider to provide verification of a social media data query-result, comprising:
   a processor to execute software instructions;
   a storage device in which to store the social media data;
   software instructions that when executed by the processor cause the system to:
   receive a social media dataset from a social media network operator, wherein the social media dataset is represented by an undirected graph with a plurality of nodes representing a corresponding unique social media network user, wherein each of the nodes contains:
      a profile corresponding to one or more of a plurality of attributes for the corresponding unique social media network user, and
      data generated by the corresponding unique social media network user;
   receive, from the social media network operator, cryptographic auxiliary information generated by the social media network operator based on the social media data set, wherein the cryptographic auxiliary information is contained in a cryptographic data structure comprising chained cryptographic information for both of the plurality of attributes and the plurality of nodes;
   receive a query about the social media dataset from a social media data consumer;
   query the social media dataset based on the query and generate the query-result based thereon;
   generate verification information by which the social media data consumer is to verify a trustworthiness of the query-result, based on the cryptographic auxiliary information; and
   provide the query-result and the verification information to the social media data consumer.

2. The system of claim 1, wherein the cryptographic auxiliary information generated by the social media network operator and based on the social media data set is contained in a cryptographic data structure comprising chained cryptographic information for each of a subset of the plurality of n nodes that share an identical plurality of w attribute values.

3. The system of claim 1, wherein the cryptographic auxiliary information generated by the social media network operator and based on the social media data set is contained in a cryptographic data structure comprising a Bloom filter comprising each unique one of the plurality of w attribute values.

4. The system of claim 1, wherein the software instructions that when executed by the processor cause the system to provide the query-result and the verification information to the social media data consumer comprise software instructions that when executed by the processor cause the system to provide to the social media data consumer:
   a subgraph G' of the graph G consisting of all the plurality of n nodes whose attribute values satisfy the query, and the edges among the nodes in G'; and
   data content affiliated with each node in G'.

5. The system of claim 4, further comprising software instructions that when executed by the processor cause the social media data consumer in the system to:
   receive the subgraph G' of the graph G consisting of all the plurality of n nodes whose attribute values satisfy the query, and the edges among the nodes in G'; and
   verify the trustworthiness of the query-result when all the plurality of n nodes in the subgraph G' are in the graph G and satisfy the query, all the edges among the nodes in G' are in the graph G, and all the attributes values of each node in the subgraph G' are intact with respect to the graph G.

6. The system of claim 4, further comprising software instructions that when executed by the processor cause the social media data consumer in the system to:
   receive the subgraph G' of the graph G consisting of all the plurality of n nodes whose attribute values satisfy the query, and the edges among the nodes in G'; and verify the subgraph G' contains: all the plurality of n nodes in the graph G that satisfy the query, and all the edges in the graph G that connect any two nodes in the subgraph G'.

7. The system of claim 4, further comprising software instructions that when executed by the processor cause the social media data consumer in the system to:
receive the subgraph G' of the graph G consisting of all the plurality of n nodes whose attribute values satisfy the query, and the edges among the nodes in G'; and
verify the data content affiliated with each node in the subgraph G' is identical to the data content affiliated with the same node in graph G.

8. A method for a social media data provider to provide verification of a social media data query-result, comprising:
receiving a social media dataset from a social media network operator, wherein the social media dataset is represented by an undirected graph with a plurality of nodes representing a corresponding unique social media network user, wherein each of the nodes contains:
a profile corresponding to one or more of a plurality of attributes for the corresponding unique social media network user, and
data generated by the corresponding unique social media network user;
receiving, from the social media network operator, cryptographic auxiliary information generated by the social media network operator based on the social media data set, wherein the cryptographic auxiliary information is contained in a cryptographic data structure comprising chained cryptographic information for both of the plurality of attributes and the plurality of nodes;
receiving a query about the social media dataset from a social media data consumer;
querying the social media dataset based on the query and generating the query-result based thereon;
generating verification information by which the social media data consumer is to verify a trustworthiness of the query-result, based on the cryptographic auxiliary information; and
providing the query-result and the verification information to the social media data consumer.

9. The method of claim 8, wherein the cryptographic auxiliary information generated by the social media network operator and based on the social media data set is contained in a cryptographic data structure comprising chained cryptographic information for each of a subset of the plurality of n nodes that share an identical plurality of w attribute values.

10. The method of claim 8, wherein the cryptographic auxiliary information generated by the social media network operator and based on the social media data set is contained in a cryptographic data structure comprising a Bloom filter comprising each unique one of the plurality of w attribute values.

11. The method of claim 8, wherein providing the query-result and the verification information to the social media data consumer comprises providing to the social media data consumer:
a subgraph G' of the graph G consisting of all the plurality of n nodes whose attribute values satisfy the query, and the edges among the nodes in G'; and
data content affiliated with each node in G'.

12. The method of claim 11, further comprising the social media data consumer in the system:
receiving the subgraph G' of the graph G consisting of all the plurality of n nodes whose attribute values satisfy the query, and the edges among the nodes in G'; and
verifying the trustworthiness of the query-result when all the plurality of n nodes in the subgraph G' are in the graph G and satisfy the query, all the edges among the nodes in G' are in the graph G, and all the attributes values of each node in the subgraph G' are intact with respect to the graph G.

13. The method of claim 11, further comprising the social media data consumer in the system:
receiving the subgraph G' of the graph G consisting of all the plurality of n nodes whose attribute values satisfy the query, and the edges among the nodes in G'; and
verifying the subgraph G' contains: all the plurality of n nodes in the graph G that satisfy the query, and all the edges in the graph G that connect any two nodes in the subgraph G'.

14. The method of claim 11, further comprising the social media data consumer in the system:
receiving the subgraph G' of the graph G consisting of all the plurality of n nodes whose attribute values satisfy the query, and the edges among the nodes in G'; and
verifying the data content affiliated with each node in the subgraph G' is identical to the data content affiliated with the same node in graph G.

15. Non-transitory computer-readable storage media having instructions stored thereupon that, when executed by a social media data provider having a processor and memory therein to execute the instructions, the instructions cause the social media data provider to provide verification of a social media data query-result, by performing the following operations:
receiving a social media dataset from a social media network operator, wherein the social media dataset is represented by an undirected graph with a plurality of nodes representing a corresponding unique social media network user, wherein each of the nodes contains:
a profile corresponding to one or more of a plurality of attributes for the corresponding unique social media network user, and
data generated by the corresponding unique social media network user;
receiving, from the social media network operator, cryptographic auxiliary information generated by the social media network operator based on the social media data set, wherein the cryptographic auxiliary information is contained in a cryptographic data structure comprising chained cryptographic information for both of the plurality of attributes and the plurality of nodes;
receiving a query about the social media dataset from a social media data consumer;
querying the social media dataset based on the query and generating the query-result based thereon;
generating verification information by which the social media data consumer is to verify a trustworthiness of the query-result, based on the cryptographic auxiliary information; and
providing the query-result and the verification information to the social media data consumer.

* * * * *